Patented June 16, 1931

1,809,871

UNITED STATES PATENT OFFICE

WALTER C. SMITH, OF MOYLAN, PENNSYLVANIA, ASSIGNOR TO CERRO DE PASCO COPPER CORPORATION, OF NEW YORK, N. Y., A CORPORATION OF NEW YORK

PRODUCTION OF BISMUTH

No Drawing.   Application filed December 31, 1928.   Serial No. 329,678.

My invention relates to the production of bismuth metal, and pertains more particularly to a process whereby industrially pure bismuth metal is produced from lead bismuth bullions.

Several methods for the partial purification of bismuth are already known, and some of these methods are described in my prior U. S. Patent 1,166,721 of January 4, 1916. The present invention comprises an improvement in known processes for producing bismuth, whereby industrially pure metal may be produced by a simplified and economical process. Another advantage of my invention rests in the fact that it provides a method for recovering pure bismuth metal, in a simple way, from raw materials which are difficult to purify by previously known processes.

Bismuth is usually obtained as a by product of the refining of other metals. It is commercially feasible to recover bismuth from ores or alloys containing a very small percentage of that metal because the bismuth is intrinsically valuable and because the presence of as little as 1% of bismuth in lead renders the latter material unsalable, or at least greatly reduces its value. In metal refining operations, bismuth is ordinarily associated with lead and the problem of producing an industrially pure bismuth metal is reduced, in practice, to the problem of separating bismuth from lead and other metals such as gold, silver, zinc, arsenic, copper and iron.

While, as I shall later describe, some of the features of my invention are generally applicable to any bismuth alloy containing as much as about 40% bismuth, certain other features of my invention relate to the steps necessary to produce such a material. I shall accordingly describe my invention as I have applied it to the recovery of pure bismuth from dust obtained by the Cerro de Pasco Copper Corporation in its operations at Oroya, Peru.

Bismuth bullion is obtained as a product of a dust smelting reverberatory furnace, the dust treated containing about 50–55% of lead, 2–2.5% of bismuth, and smaller quantities of other metals. The bismuth bullion thus produced contains about 77% of lead, 20% of bismuth, and about 3% of metals such as silver, gold, copper, arsenic, antimony, and iron.

In practise, I treat this or other similar materials as follows:—

Stage I

The bullion is melted in a reverberatory furnace and air is blown through it. The effect of the air treatment is to oxidize the arsenic, antimony, and lead which forms a slag blanket. If the impurities present do not form a sufficient slag blanket, molten slag may be added specially for that purpose. It is distinctly advantageous to conduct the oxidation treatment under a slag blanket because, under such conditions, a reaction takes place between the slag and the molten metal, the tendency of the reaction being to cause lead, antimony, arsenic, tin, etc. to enter the slag, the bismuth metal remaining behind.

I prefer to continue the oxidation treatment until the resultant alloy contains about 65% of bismuth and from 31–33% of lead, the balance being silver and other metals. The operation may be carried thus far with a loss in the slag of about 20% of the bismuth originally present. It should be understood, however, that the percentage of bismuth in the bullion may be increased to about 75% if desired, the loss of bismuth in the slag amounting to about 25%. On the contrary, one may stop the operation sooner, and may thus prepare an alloy containing any proportion of bismuth between the 20%, originally present, and 75%. When the concentration of bismuth reaches about 75%, further air oxidation becomes unprofitable because the bismuth and lead tend to slag off together.

The precise bismuth concentration at which it is profitable to work depends on the arrangement of the plant and the desired disposition of the by-products. By attaining the greatest possible concentration of bismuth in this stage, the loss of bismuth in the slag is increased so that more material must be reworked. On the other hand, the next stage of the process which I am about to describe, may be worked most economically on a bismuth lead alloy containing 65-75% of bismuth.

Stage II

Bismuth lead alloys containing about 40-75% bismuth, 57-23% of lead, and about 3% of other metallic impurities form the raw material for Stage II of my process. Such alloys may be obtained from Stage I of my process, by the well-known cupelling process, and by other prior art methods. This step of my process relates to the formation of a certain type of matte from the molten alloy, the lead and other impurities leaving the molten bismuth and entering the matte which is then separated from the purified bismuth.

I may produce such a matte by several alternative procedures, as follows:—

(A) The alloy is melted in a reverberatory furnace, the temperature being kept as low as is conveniently possible. Elemental sulfur in lump or powdered form is stirred into the alloy and iron sulfide is likewise added. The temperature of the mixture must usually be increased somewhat at this point to maintain the mixture in molten condition. The amount of sulfur added should be sufficient to combine with the lead present and with the other metallic impurities.

As the result of this treatment a lead-iron matte is formed and this may be mechanically separated from the bismuth metal by casting the mixture and breaking off the matte.

The addition of the iron sulfide is an important feature in this method of purification, since it is essential to the formation of the type of matte described and to the removal of metallic impurities from the bismuth.

(B) While the procedure described under (A) is useful in producing a metal containing about 97% of pure bismuth, a better result may be obtained as follows. The alloy is melted as before and metallic copper is added to it in an amount substantially equal to the lead present. Sulfur is added as before, the amount added being sufficient to combine, as sulfide, with all of the lead and copper present,—plus an excess of about 10%.

As the result of this treatment a copper-lead matte is formed, the major portion of the other impurities entering this matte. The matte is separated as in (A) and the product of the process is a refined metal containing 97-98% of bismuth, the impurities being sulfur, silver, lead and traces of other metals.

While the best result may be obtained by adding the copper and sulfur in the order described, the procedure may be varied by first adding the sulfur, the copper being added later.

(C) I have further discovered that the best results are obtained by a combination of steps (A) and (B). The copper is more effective in removing most impurities than is the iron, but the presence of iron in combination with the copper and lead in the matte has certain additive advantages, as follows:

1. the iron-copper-lead matte is the easiest to remove from the solidified metal after casting;
2. the presence of the iron tends to lower the specific gravity of the matte and thus promote a clean separation of the two when in molten condition;
3. the iron increases the bulk of the matte, which is advantageous in removing the last trace of silver.

For the reasons indicated I prefer to add iron sulfide to the molten bismuth subsequent to the addition of the copper and sulfur. In place of iron sulfide, proportionate amounts of iron and sulfur may be used. The amount of iron sulfide added is varied in accordance with the precise methods of operation. In general, a quantity approximating 100 to 200% of the copper-lead matte is employed.

The matte is separated from the cast metal as previously described, and the resultant product is a metal somewhat purer than that obtained by step (B).

The matte obtained in Stage II is returned to the sulfur treatment. The bismuth metal obtained is already pure enough for some purposes, but it may be further purified as follows:—

Stage III

The metal from Stage II contains some sulfur and may be further contaminated by the presence of fragments of matte. It may be further purified by a liquation treatment. For this purpose it is heated in a furnace to a temperature at which the pure bismuth "sweats away" from the crusts of impurities which remain unmelted. The liquation crusts are returned to the sulfur treatment of Stage II. The pure metal thus obtained contains about 99% bismuth, the residual impurities comprising silver, antimony, arsenic, etc.

If desired, this metal may be further purified by a variety of well-known methods such as crystallization, "zincing", electrolysis, or treatment with caustic soda.

I claim:

1. A process for producing bismuth from a molten bismuth-lead alloy which comprises adding sulfur and a metallic ingredient adapted to unite with the sulphur to form a matte capable of absorbing lead, and separating said matte from the purified bismuth thus produced.

2. A process for producing bismuth from a molten bismuth-lead alloy containing silver and other metallic impurities which comprises adding sulfur and a metallic ingredient adapted to unite with the sulphur to form a matte capable of absorbing lead, and separating said matte from the purified bismuth thus produced.

3. A process for producing bismuth from a molten bismuth-lead alloy which comprises adding metallic copper and sulfur to said molten alloy, and separating the matte thus formed from the purified bismuth thus produced.

4. A process of the type described in claim 3 in which the product is further purified by liquation.

5. A process for producing bismuth from a molten bismuth-lead alloy which comprises adding metallic copper, sulfur, and iron sulfide to said molten alloy, and separating the matte thus formed from the purified bismuth thus produced.

6. A process for producing bismuth from a molten bismuth-lead alloy which comprises forming an iron-copper-lead matte in said alloy and separating said matte from the purified bismuth thus produced.

7. A process for producing bismuth from a molten bismuth-lead alloy which comprises forming a matte containing copper and iron in said alloy and separating said matte from the purified bismuth thus produced.

8. A process for producing bismuth from a molten bismuth-lead alloy which comprises adding metallic copper in amount substantially equal to the lead present, adding sulfur in amount sufficient to combine as sulfide with the lead and copper, plus an excess of about 10%, and separating the matte thus formed from the purified bismuth thus produced.

9. A process for producing bismuth from a molten bismuth-lead alloy which comprises adding metallic copper in amount substantially equal to the lead present, adding sulfur in amount sufficient to combine as sulfide with the lead and copper, plus an excess of about 10%, adding iron sulfide, and separating the matte thus formed from the purified bismuth thus produced.

10. A process of the type described in claim 9 in which the product is further purified by liquation.

11. A process for the production of bismuth from a bismuth-lead bullion which comprises melting said bullion under a cover of molten slag, blowing air therethrough until the molten alloy contains 40-75% of bismuth, adding sulfur and a metallic ingredient adapted to unite with the sulphur to form a matte capable of absorbing lead, and separating said matte from the purified bismuth thus produced.

12. A process of the type described in claim 11 in which the product is further purified by liquation.

13. A process for the production of bismuth from a bismuth-lead bullion which comprises melting said bullion under a cover of molten slag, blowing air therethrough, until the molten alloy contains about 65-75% of bismuth, adding metallic copper and sulfur, and separating the matte thus formed from the purified bismuth thus produced.

14. A process for the production of bismuth from a bismuth-lead bullion which comprises melting said alloy under a cover of molten slag, blowing air therethrough until the molten alloy contains about 67-75% of bismuth, adding metallic copper in amount substantially equal to the lead present, adding sulfur in amount sufficient to combine, as sulfide, with the lead and copper, and separating the matte thus formed from the purified bismuth thus produced.

15. A process of the type described in claim 14 in which iron sulfide is added to the molten mixture prior to the separation of the matte.

16. A process for the production of bismuth from a molten bismuth-lead alloy, which comprises adding sulphur and copper to the molten alloy and separating the matte thus formed from the bismuth.

17. A process for the production of bismuth from a molten bismuth-lead alloy, which comprises adding sulphur, copper and iron to the molten alloy and separating the matte thus formed from the bismuth.

18. A process for the production of bismuth from a molten bismuth-lead alloy which comprises adding copper in amount substantially equal to the lead present, adding sulphur in amount sufficient to combine as sulphide with the lead and copper, and separating the matte thus formed from the purified bismuth.

19. A process for producing bismuth from a molten bismuth-lead alloy, which comprises adding copper and iron to the molten alloy, adding sulphur in amount sufficient to combine as sulphide with the lead, copper and iron, and separating the matte thus formed from the purified bismuth.

In testimony whereof, I have signed my name to this specification this 27th day of December, 1928.

WALTER C. SMITH.